United States Patent [19]

Katashiba et al.

[11] Patent Number: 6,076,502
[45] Date of Patent: Jun. 20, 2000

[54] EXHAUST GAS RECIRCULATION CONTROL SYSTEM FOR INTERNAL COMBUSTION ENGINES

[75] Inventors: Hideaki Katashiba; Hironori Matsumori; Hirofumi Ohuchi; Wataru Fukui; Yoichi Kadota; Ryoji Nishiyama, all of Tokyo, Japan

[73] Assignee: Mitsubishi Denki Kabushiki Kaisha, Tokyo, Japan

[21] Appl. No.: 09/042,553

[22] Filed: Mar. 17, 1998

[30] Foreign Application Priority Data

Mar. 26, 1997 [JP] Japan .................................... 9-073708

[51] Int. Cl.[7] ................................................. F02M 25/07
[52] U.S. Cl. ..................................... 123/435; 123/568.16
[58] Field of Search .................................... 123/295, 305, 123/435, 406.48, 568.16, 568.21, 568.23, 568.24, 568.26; 701/108

[56] References Cited

U.S. PATENT DOCUMENTS

| | | | |
|---|---|---|---|
| 4,433,667 | 2/1984 | Ripper | 123/568.21 |
| 5,343,844 | 9/1994 | Fukui et al. | 123/481 |
| 5,425,339 | 6/1995 | Fukui | 123/406.26 |
| 5,617,833 | 4/1997 | Tomisawa et al. | 123/568.16 |
| 5,749,334 | 5/1998 | Oda et al. | 123/305 |
| 5,758,309 | 5/1998 | Satoh | 123/568.26 |

OTHER PUBLICATIONS

"Ion–Gap Sensing for Engine Control", Automotive Engineering/Sep. 1995.

SAE Paper No. 950004, "Ion–Gap Sense in Misfire Detection", Feb. 27–Mar. 2, 1995.

Primary Examiner—Willis R. Wolfe
Attorney, Agent, or Firm—Sughrue, Mion, Zinn, Macpeak & Seas, PLLC

[57] ABSTRACT

An exhaust gas recirculation control system for internal combustion engines, comprising an exhaust gas recirculation passage for recirculating a part of an exhaust gas from an internal combustion engine into the engine; an exhaust gas recirculation control valve for controlling a flow rate of the exhaust gas flowing in the exhaust gas recirculation passage; an opening degree controller for controlling an opening degree of the exhaust gas recirculation control valve; an operating condition detector for detecting an operating condition of the engine; means for setting a target exhaust gas recirculation ratio depending on the detected operating condition; a combustion state detector for detecting a combustion state in at least one cylinder of the engine; means for finding an actual exhaust gas recirculation ratio of the engine based on the detected combustion state; and means for controlling the opening degree controller so as to bring the actual exhaust gas recirculation ratio to the target exhaust gas recirculation ratio.

13 Claims, 10 Drawing Sheets

EXHAUST GAS RECIRCULATION CONTROL SYSTEM FOR INTERNAL COMBUSTION ENGINES

BACKGROUND OF THE INVENTION

1. Field of the Invention

The present invention relates to an exhaust gas recirculation (hereinbelow, referred to as EGR) control system which controls recirculation of a part of an exhaust gas from an internal combustion engine into an intake pipe of the engine.

2. Discussion of Background

Figure 10:
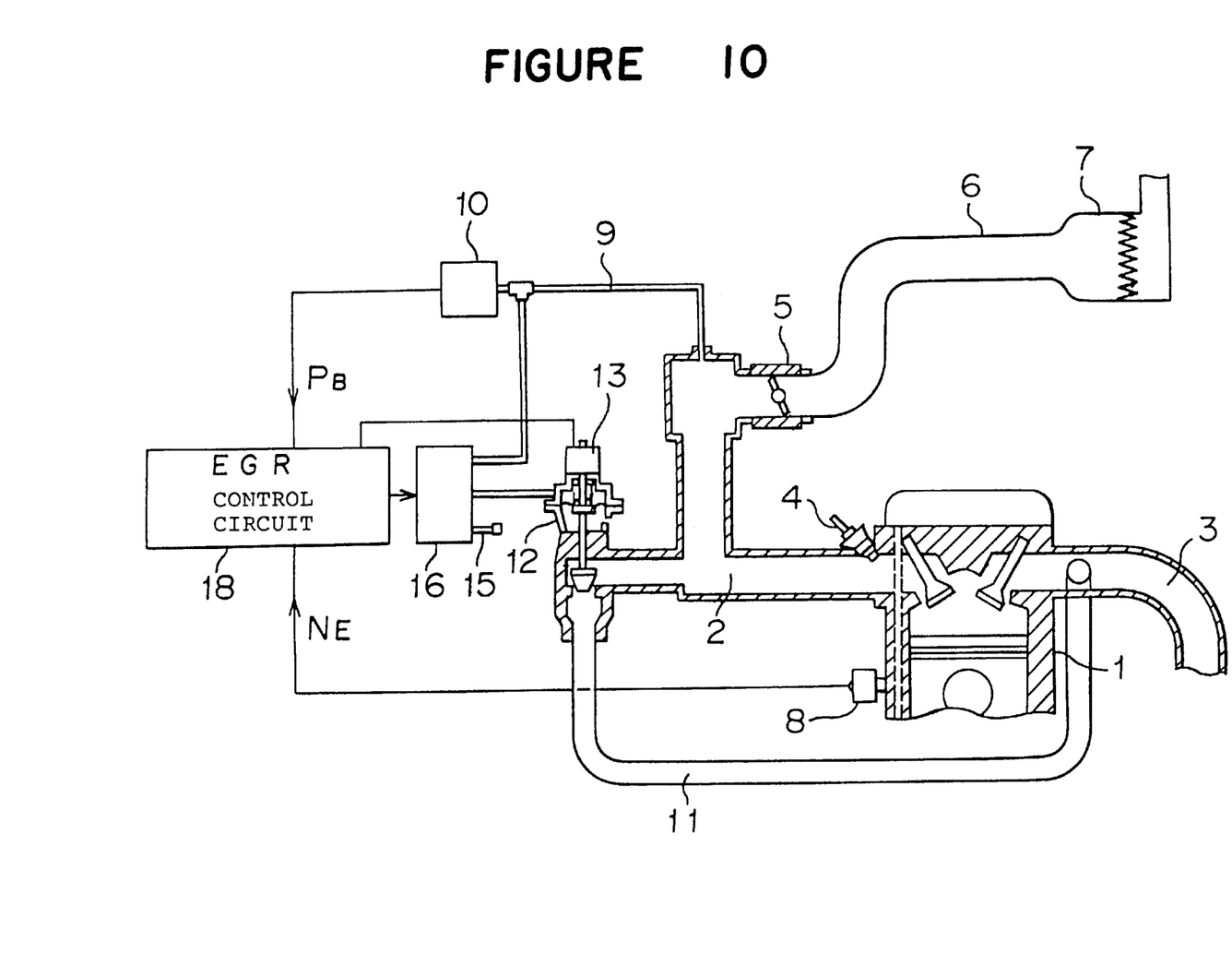
FIG. 10 is a schematic diagram showing the structure of a conventional EGR control system.

In order to reduce nitrogen oxide as a noxious substance included in an exhaust gas from an internal combustion engine, it is remarkably effective to lower the combustion temperature. A method to recirculate the exhaust gas into the combustion chamber has been well-known as a measure to lower the combustion temperature. In FIG. 10 is shown the EGR control system which has been disclosed in JP-A-5593950. In this Figure, reference numeral 1 designates an engine, reference numeral 2 designates an intake manifold, reference numeral 3 designates an exhaust manifold, reference numeral 4 designates a fuel-supply system which is arranged in the intake manifold 2, reference numeral 5 designates a throttle valve, reference numeral 6 designates an intake duct, reference numeral 7 designates an air cleaning, reference numeral 8 designates a crank angle sensor for detecting an engine speed, reference numeral 9 designates a vacuum introduction passage, reference numeral 10 designates an intake vacuum detector for detecting the pressure in the intake manifold 2 through the vacuum introduction passage 9, reference numeral 11 designates an EGR passage for connecting the exhaust manifold 3 to the intake manifold 2, reference numeral 13 designates an opening degree detector for an EGR control valve 12 with a pressure diaphragm arranged therein, reference numeral 18 designates an EGR control circuit, reference numeral 15 designates an atmospheric pressure introduction passage, and reference numeral 16 designates a control vacuum generator as a valve opening degree control device, which controls the opening degree of the EGR control valve 12 depending on an atmospheric pressure and a control vacuum to be controlled in accordance with an output signal from the EGR control circuit 18.

In the EGR control system for an internal combustion engine thus constructed, an engine speed $N_E$ and an intake vacuum $P_B$ which indicate the operating conditions of the engine are detected by the engine speed detector 8 and the intake vacuum detector 10, and $N_E$ and $P_B$ are inputted into the EGR control circuit 18. In the EGR control circuit 18 are set target opening degrees for the EGR control valve 12 which are determined depending on the operating conditions of the engine. The EGR control circuit forwards an output signal to the control vacuum generator 16 so that the comparison deviation between a determined target opening degree and an actual opening degree inputted through the opening degree detector 13 becomes zero. The control vacuum generator 16 adjusts an output vacuum by the intake vacuum based on the output signal forwarded from the EGR control circuit 18 to control the opening degree of the EGR control valve 12, determining the recirculation amount of the exhaust gas which can make the comparison deviation zero.

In other words, the opening degree of the EGR control valve 12 is feedback-controlled using the output from the opening degree detector 13 to obtain an EGR amount which fits to the operating conditions of the engine.

In such a conventional EGR control system, however, carbon particles or other particles included in the exhaust gas adhere to the EGR control valve 12 at a large amount because of long use of the valve 12 to introduce a change in the initially intended EGR amount corresponding to an opening degree of the EGR control valve 12, creating a problem in that it is impossible to carry out flow control with good accuracy. For example, if such a change causes an EGR ratio to increase, drivability would deteriorate, and if such a change causes the EGR ratio to decrease, the combustion temperature would rise to increase the amount of NOx components in the exhaust gas.

In addition, there is created a problem in that it is impossible to cope with an abnormality due to deterioration of a component part in the EGR control system.

SUMMARY OF THE INVENTION

It is an object of the present invention to solve these problems, and to provide an EGR control system capable of coping with a change in the EGR control valve 12, the EGR passage 11 and other parts with lapse of time to carry out EGR control with high accuracy or capable of detecting an abnormality in the EGR control valve 12, the EGR passage 11 and other parts with lapse of time, for the purpose to carry out the EGR control in a stable way for a long period of time.

According to a first aspect of the present invention, there is provided an exhaust gas recirculation control system for internal combustion engines, which comprises an exhaust gas recirculation passage for recirculating a part of an exhaust gas from an internal combustion engine into the engine; an exhaust gas recirculation control valve for controlling a flow rate of the exhaust gas flowing in the exhaust gas recirculation passage; an opening degree controller for controlling an opening degree of the exhaust gas recirculation control valve; an operating condition detector for detecting an operating condition of the engine; means for setting a target exhaust gas recirculation ratio depending on the detected operating condition; a combustion state detector for detecting a combustion state in at least one cylinder of the engine; means for finding an actual exhaust gas recirculation ratio of the engine based on the detected combustion state; and means for controlling the opening degree controller so as to bring the actual exhaust gas recirculation ratio to the target exhaust gas recirculation ratio.

According to a second aspect of the present invention, the control system further comprises failure detecting means for determining that when a deviation between the target exhaust gas recirculation ratio and the actual exhaust gas recirculation ratio is not less than a predetermined value for a predetermined period of time, a failure occurs.

According to a third aspect of the present invention, there is provided an exhaust gas recirculation system for internal combustion engines, which comprises an exhaust gas recirculation passage for recirculating a part of an exhaust gas from an internal combustion engine into the engine; an exhaust gas recirculation control valve for controlling a flow rate of the exhaust gas flowing in the exhaust gas recirculation passage; an opening degree controller for controlling an opening degree of the exhaust gas recirculation control valve; a combustion state detector for detecting a combustion state in at least one cylinder of the engine; and failure detecting means which compares the combustion state detected by opening and closing the exhaust gas recirculation control valve, and determines that when a result obtained by the comparison is outside a predetermined range, a failure occurs.

According to a fourth aspect of the present invention, the combustion state detector comprises an ion current detector for flowing an ion current in at least one cylinder in the engine and detecting the ion current flowing therein, means for flowing a signal indicative of the ion current in a predetermined period of time to carry out generation and detection of a current component corresponding to a combustion level in the cylinder, combustion state quantity finding means for finding a combustion state quantity in the cylinder based on the detected current component, and combustion variable quantity finding means for finding a variable quantity in the cylinder based on the combustion state in a present cycle and the combustion state in a cycle prior to the present cycle found by the combustion state quantity finding means.

According to a fifth aspect of the present invention, the combustion state quantity is represented by an ion current integral value or a main combustion period.

According to a sixth aspect of the present invention, the main combustion period is a period wherein the ion current detected by the ion current detector is not less than a predetermined value.

According to a seventh aspect of the present invention, the combustion variable quantity finding means finds the variable quantity by finding a standard deviation of combustion state quantities in a predetermined period of cycles obtained by the combustion state quantity finding means.

According to an eighth aspect of the present invention, the combustion variable quantity finding means finds a variable state based on a ratio of an absolute value of a difference between a first combustion state quantity in a present cycle obtained by the combustion state quantity finding means and a second combustion state quantity in a cycle prior to the present cycle obtained by the combustion state quantity finding means to an average value of the first combustion state quantity and the second combustion state quantity, and finds the variable quantity by integrating the variable state by a predetermined cycle number.

According to a ninth aspect of the present invention, the combustion variable quantity finding means finds the variable quantity by finding a deviation of the combustion state quantity in a present cycle obtained by the combustion state quantity finding means and a moving average value in a predetermined period of cycles prior to the present cycle obtained by the combustion state quantity finding means.

The present invention offers the following advantages since the present invention is constructed as explained.

In accordance with the first aspect, it is possible to carry out EGR control with high accuracy so as to cope with a change with lapse of time such as deterioration in the EGR passage or the EGR control valve. It is possible to carry out the EGR control in a stable way for a long period of time in such a manner that drivability is not prevented from deteriorating and exhaust of NOx decreases.

In accordance with the second aspect, it is possible to detect an abnormality due to a change with lapse of time such as deterioration in the EGR passage or the EGR control valve and to cope with such an abnormality.

In accordance with the third aspect, it is possible to ensure detection of an abnormality due to a change with lapse of time such as deterioration in the EGR passage or the EGR control valve and to cope with such an abnormality.

In accordance with the fourth aspect, it is possible to detect the combustion state in respective cylinders per a combustion cycle.

In accordance with the fifth aspect, it is possible to obtain an output in proportional to the combustion amount of a fuel or an output in proportion to the main combustion period in respective cylinders.

In accordance with the sixth aspect, it is easy to find the combustion state quantity.

In accordance with the seventh aspect, it is possible to accurately find the combustion variable quantity with simple calculation.

In accordance with the eighth aspect, it is possible to find the combustion variable quantity more accurately because the variable value become larger.

In accordance with the ninth aspect, it is possible to find the combustion variable quantity more accurately because the variable value becomes larger.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Embodiment 1

Figure 1:
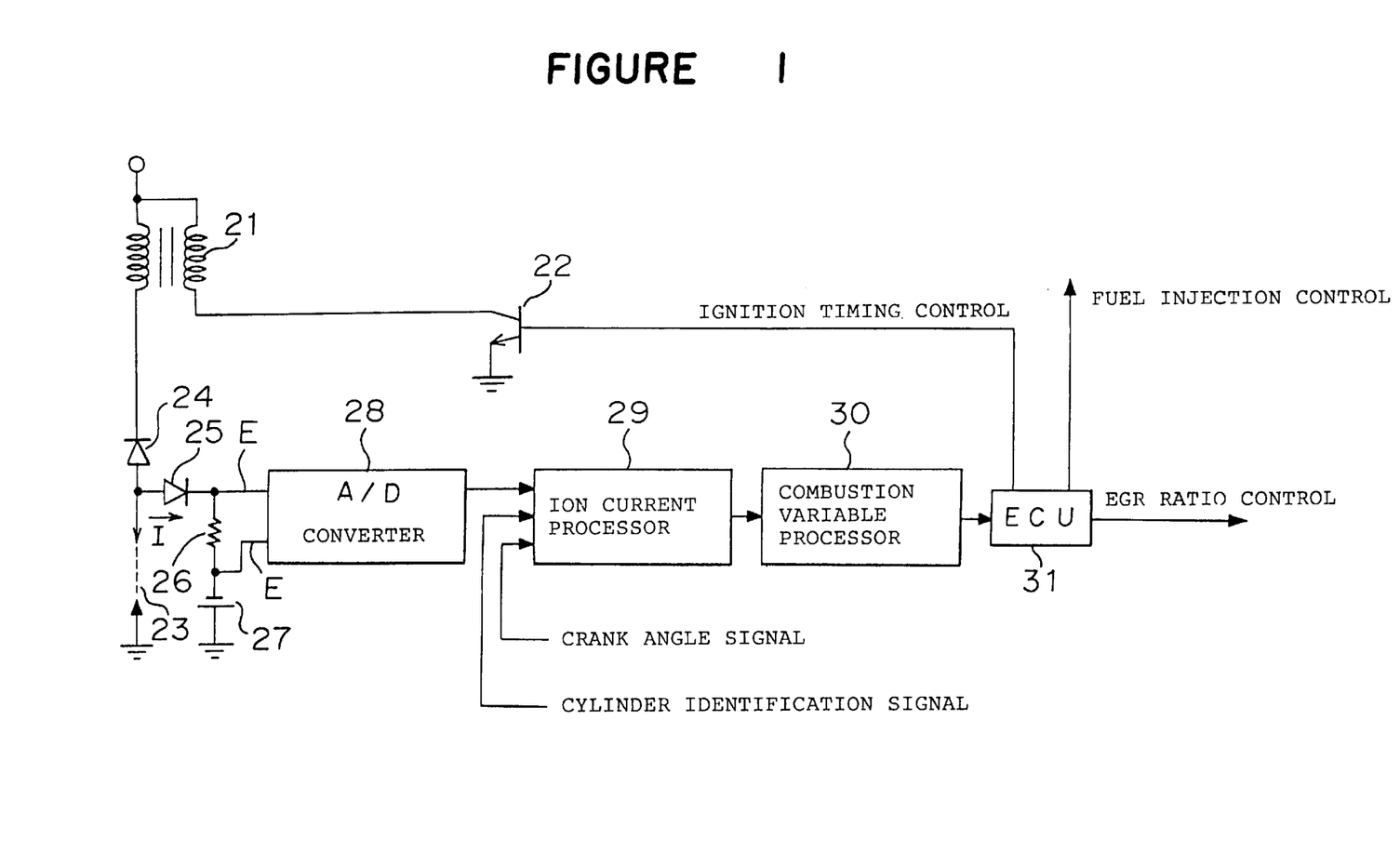
FIG. 1 is a schematic diagram of the structure of an essential portion of the EGR control system according to a first embodiment of the present invention.

Now, a first embodiment of the present invention will be described with reference to the accompanying drawings. In FIG. 1 is shown the structure of an essential portion of the EGR control system according to the first embodiment. The basic structure of the EGR control system is similar to e.g. the conventional system shown in FIG. 10. In FIG. 1, reference numeral 21 designates an ignition coil, reference numeral 22 designates a power transistor which is connected to a primary coil of the ignition coil 21 in a common-emitter mode, reference numeral 23 designates an ignition plug which is connected to a secondary coil of the ignition coil 21, and reference numeral 24 designates a reverse current blocking diode which is connected between the ignition coil 21 and the ignition plug 23. Although an ignition system to a single cylinder, which is constituted by the ignition coil 21, the power transistor 22, the ignition plug 23 and the diode 24, is representatively shown in FIG. 1, such an ignition system is provided to each cylinder.

Reference numeral 25 designates another reverse current blocking diode which is connected to an end of the ignition plug 23, reference numeral 26 designates a load resistor which converts an ion current I into a voltage value, reference numeral 27 designates a d.c. power source which is connected to the load resistor 26, and reference numeral 28 designates an A/D converter which converts a signal indicative of the ion current into a digital value.

Reference numeral 29 designates an ion current processor as combustion state quantity finding means, which carries out arithmetic manipulations to the ion current signal based on a cylinder identification signal and a crank angle signal outputted from a crank angle sensor for a crank shaft of the engine, and outputs a combustion state quantity signal based on the arithmetic manipulations. Reference numeral 30 designates a combustion variable processor as combustion variable quantity finding means, which finds a combustion variable quantity in the cylinder based on the combustion state quantity in a present cycle and the combustion state quantity in a cycle prior to the present cycle found by the ion current processor 29. Reference numeral 31 designates an engine control unit (hereinbelow, referred to as ECU), which carries out not only EGR ratio control but also fuel injection amount control as well as ignition timing control.

Now, a method for detecting the combustion state will be explained.

First, the ion current I is flowed just after discharging the ignition coil 23, and the ion current flowing in the ignition plug 23 is detected. The detected ion current I is converted into a voltage value by the load resistor 26. The ion current signal E indicative of the voltage value is converted into a digital signal through the A/D converter 28, and is outputted to the ion current processor 29.

The ion current processor 29 carries out arithmetic manipulations to the ion current signal based on the cylinder identification signal and the crank angle signal outputted from the crank angle sensor for the engine, and outputs the combustion state variable signal to the combustion variable processor 30.

The combustion variable processor 30 carries out arithmetic manipulations to find the combustion variable quantity based on the combustion state quantity signal for individual cylinders outputted from the ion current processor 29 for each combustion cycle, and outputs the found combustion variable quantity to the ECU 31. The arithmetic manipulations to the combustion variable quantity may be carried out by e.g. finding a standard deviation of the combustion state quantity in a predetermined period of cycles in accordance with the following formula:

$$CV_0(n) = \sqrt{\frac{m \cdot \sum_{n=n-m}^{n} D(n)^2 - \left(\sum_{n=n-m}^{n} D(n)\right)^2}{m^2}} \quad (1)$$

In the formula, $CV_0(n)$ represents the combustion variable quantity in an n-th combustion cycle, $D(n)$ represents the combustion state quantity in the n-th combustion cycle, and m represents the number of data for the standard deviation to be found in accordance with the formula (1) though m may be altered depending on the operating conditions, variability in the data and so on.

Although the standard deviation for a single cylinder is used as a value indicative of the combustion variable quantity, the standard deviation for a representative cylinder or an average value of the standard deviations for two cylinders or more may be used.

Figure 2:
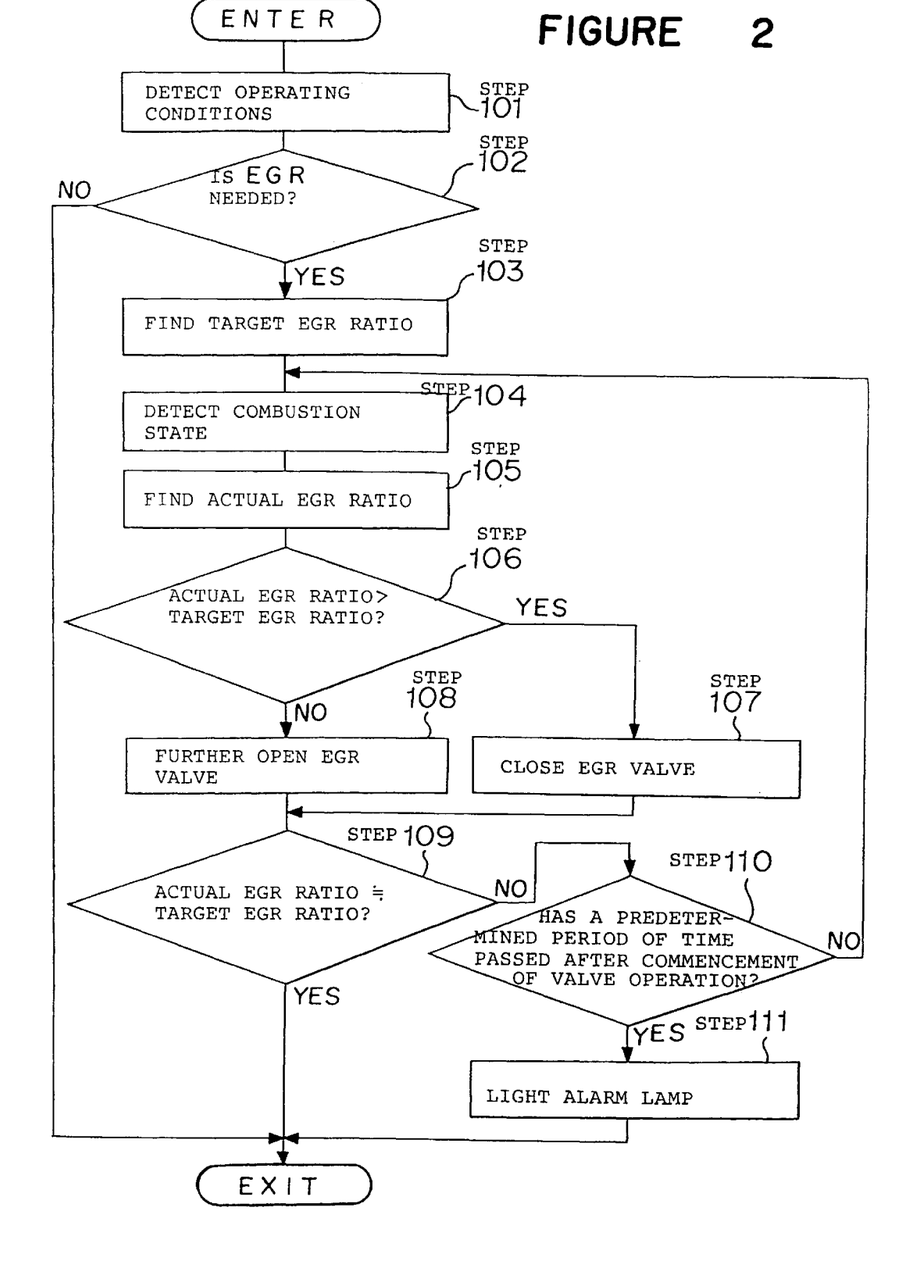
FIG. 2 is a flowchart showing the EGR control of the EGR control system shown in FIG. 1.

Next, a method to control the EGR ratio will be described. In FIG. 2 is shown a flowchart of a control algorithm for the EGR ratio. The control algorithm is software which is equipped in the ECU 31 explained with respect to FIG. 1, and which is started by an crank angle signal for the engine or a timer signal interrupt like ignition timing control or fuel control.

At Step 101, the operating conditions of the engine are detected. The operating conditions of the engine are represented by an intake air amount and an engine speed detected at the crank angle sensor. At Step 102, it is determined whether the present operating conditions need introduction of EGR or not. If affirmative at Step 102, a target EGR ratio is found at Step 103. Target EGR ratios have been put into a map form, wherein EGR ratios which can decrease NOx and do not lower drivability due to a drop in the combustion amount by exhaust gas recirculation have been experimentally found and tabulated.

Figure 3:
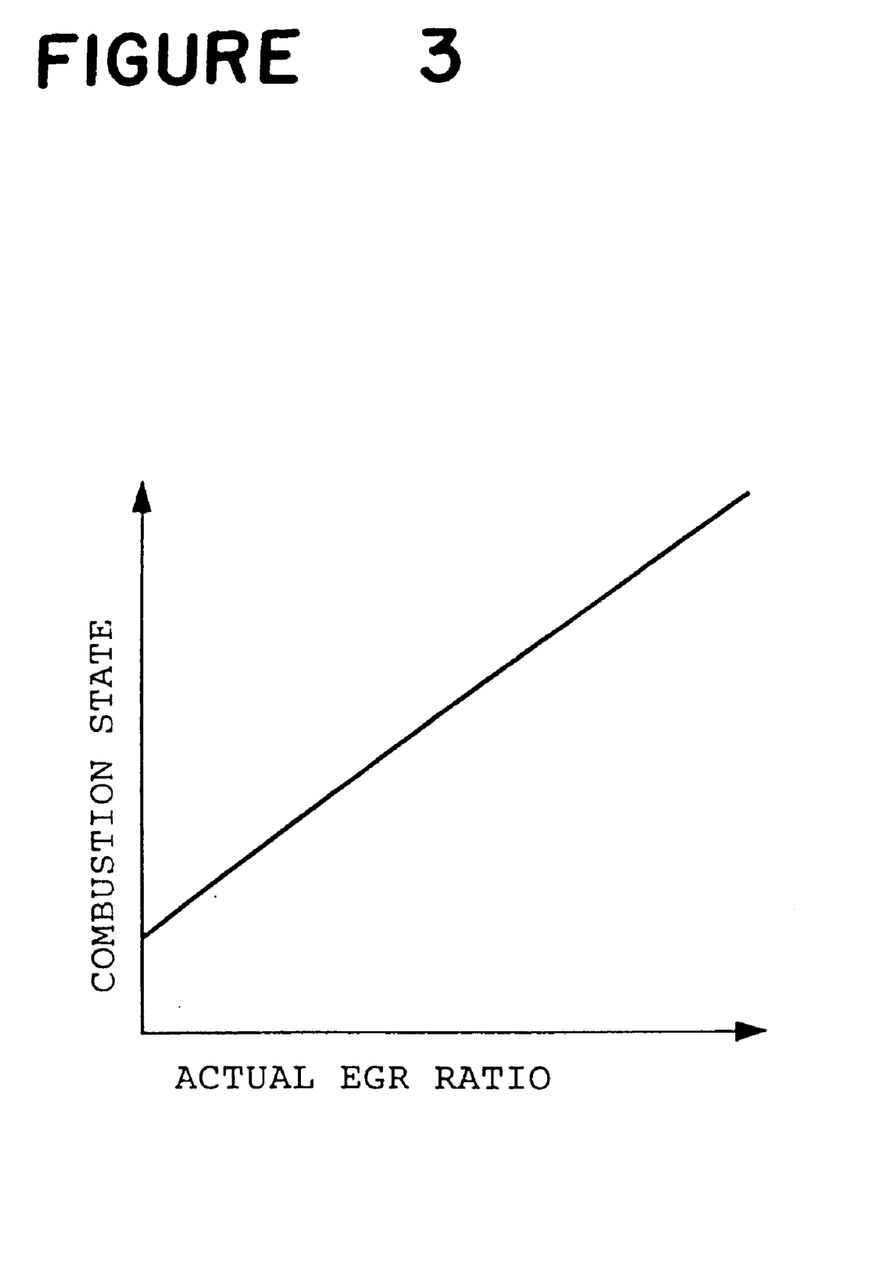
FIG. 3 is a characteristic graph showing a relationship between the actual EGR ratio and the combustion state according to the first embodiment.

The next Step 104 is a routine wherein the combustion state in at least one cylinder in the engine is detected to find an actual EGR ratio based on a change in the combustion state caused by introduction of EGR, and which is carried out by the ion current processor 29 and the combustion variable processor 30. At Step 105, the actual EGR ratio is found based on the combustion state in accordance with e.g. a relationship between each actual EGR ratio and each combustion state experimentally found as shown in FIG. 3.

At Step 106, the target EGR ratio found at Step 103 is compared with the actual EGR ratio found at Step 105. If the actual EGR ratio is greater, the EGR control valve is closed to decrease the EGR introduction amount at Step 107. Conversely, if the target EGR ratio is greater, the EGR control valve is further opened to increase the EGR introduction amount at Step 108.

At Step 109, the actual EGR ratio and the target EGR ratio are compared again, and if both ratios are substantially the same, the EGR control ends. If negative, it is determined at Step 110 whether a predetermined period of time has passed after commencement of the EGR control valve operation. If negative, the process returns to Step 104 to carry out the EGR ratio control again. If the actual EGR ratio fails to become substantially the same as the target EGR ratio in the predetermined period of time after commencement of the valve operation, it is determined that the system is out of order, and an alarm lamp is lit at Step 111.

In accordance with this embodiment, the actual EGR ratio is found based on detection of the actual combustion state, and the actual EGR ratio is controlled so as to conform to the target EGR ratio depending on the operating conditions of the engine as explained. The EGR control can be carried out with high accuracy so as to cope with a change in the EGR control valve 12, the EGR passage 11 or other parts with lapse of time.

The provision of such failure detecting means can detect an abnormality due to a change in the EGR control valve 12, the EGR passage 11 and other parts with lapse of time.

As explained, the EGR control valve is feedback-controlled so as to minimize the deviation between the actual EGR ratio and the target EGR ratio. The operation of the EGR control valve involves operation delay regardless of DC motor drive or stepping motor drive. Considering such operation delay, verification of whether the actual EGR ratio has been brought closest to the target EGR ratio is required to be carried out after the certain period of time has passed. The certain period of time is set depending on the characteristics of adopted valve drive (e.g. 100 msec for DC motor drive, and 200 msec for stepping motor drive).

In the failure detection according to the present invention, if the actual EGR ratio has not achieved the target EGR ratio after lapse of the certain period of time wherein the EGR control valve is normal operation is supported to have completed required operation, it is determined that a failure has occurred.

Embodiment 2

Although it is determined in the first embodiment that a failure occurs when the deviation between the target EGR ratio and the actual EGR ratio is not less than a predetermined value for a predetermined period of time, it may be determined that a failure occurs when a comparison result which is obtained by comparing the combustion state detected by opening and closing the EGR control valve is outside a predetermined range.

For example, specifically, a signal indicative of closing the EGR control valve is forwarded in a normal operation for failure detection, and a signal indicative of opening the control valve at a predetermined opening degree for failure detection is forwarded when combustion state detection signals are stabilized after movement of the control valve (in e.g. about 1 sec–about 10 sec). The combustion state, e.g. the ion current, at each of the opening degrees of the control valve is detected and compared. If the compression results is outside a predetermined range, it is determined that a failure occurs. In other words, if the combustion state is not changed though signals indicative of closing and opening the control valve are forwarded, it is supposed that the control valve would be inoperative or a failure such as clogging in the EGR passage would occur.

Such failure detection may be carried out every predetermined travel distance or every predetermined travel time.

In the first embodiment, a failure is detected during the EGR control, which makes failure detection difficult when control instructions are transitionally changed. In the second embodiment, the failure determination mode is independently provided to ensure failure determination.

If the difference between the opening and the closing of the EGR control valve is increased, the failure determination can be carried out with high accuracy.

Embodiment 3

Figure 4:
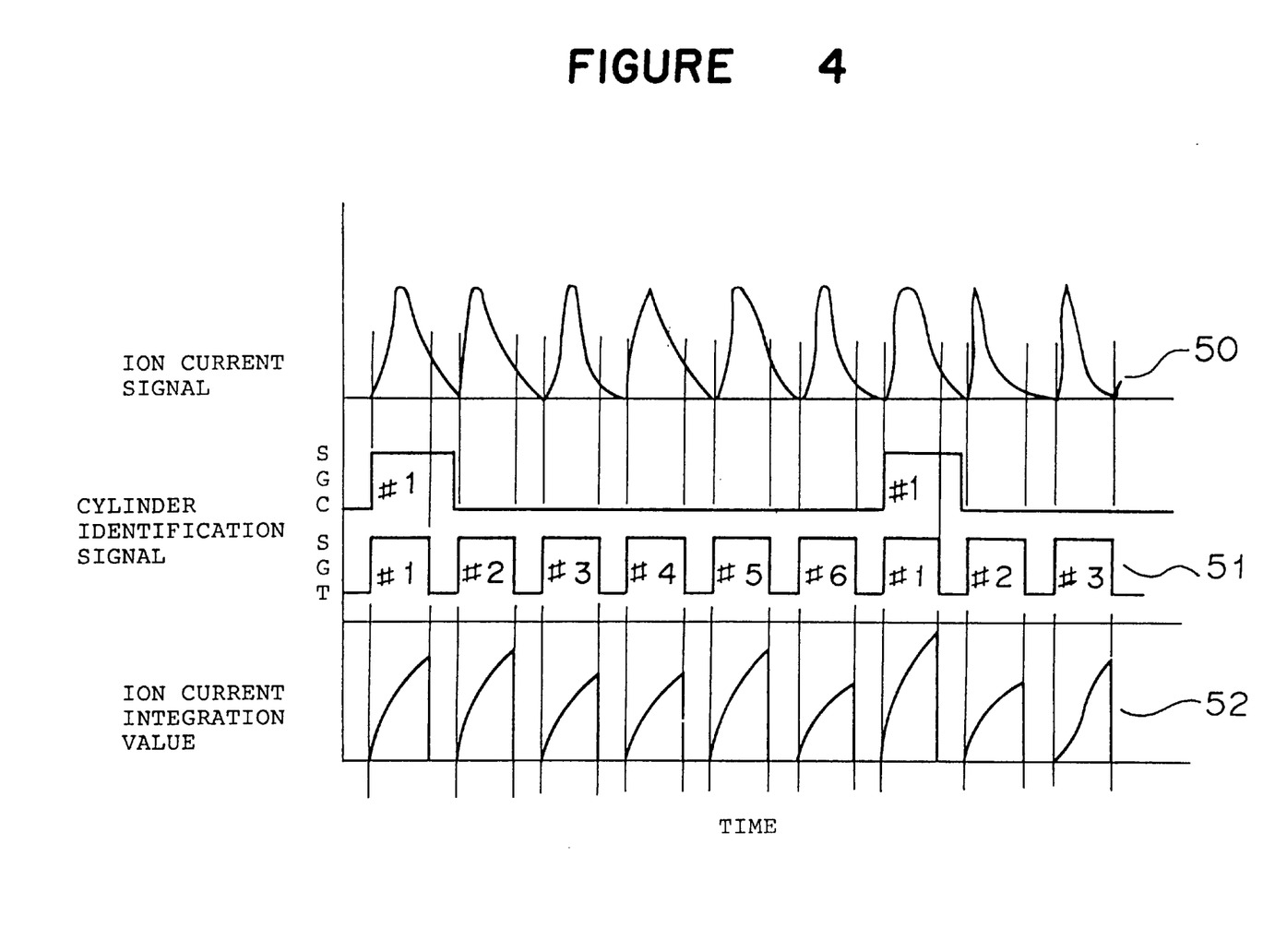
FIG. 4 is a diagram showing the ion current signal and the combustion state quantity according to a third embodiment of the present invention.

The arithmetic manipulations of the combustion state quantity at the ion current processor 29 shown in FIG. 1 according to the first embodiment will be explained. The other features are the same as those of the first embodiment 1, and explanation of the other features will be omitted. In FIG. 4 is shown a diagram of the ion current signals and the combustion state quantities according to a third embodiment of the present invention. In this Figure, reference numeral 50 designates the waveform of each of ion current signals which are obtained by converting ion current outputs of respective cylinders in the combustion cycle into voltages, reference numeral 51 designates cylinder identification signals which comprise an SGC signal for determining the position of a first cylinder and an SGT signal indicative of the position of each cylinder, and reference numeral 52 designates the combustion state quantity of each cylinder, which is found based on the reference signals (cylinder identification signals).

Now, a method to find the combustion state quantity will be explained.

As explained with reference to the first embodiment using FIG. 1, the ion current signal E is converted into a digital signal to the A/D converter 28, and is outputted to the ion current processor 29.

The ion current processor 29 find, as the combustion state quantity, ion current integral values which are obtained by integration in an integration interval (an interval from a rise to the next rise of the cylinder identification signal SGT) for each cylinder as shown in FIG. 4.

Figure 5:
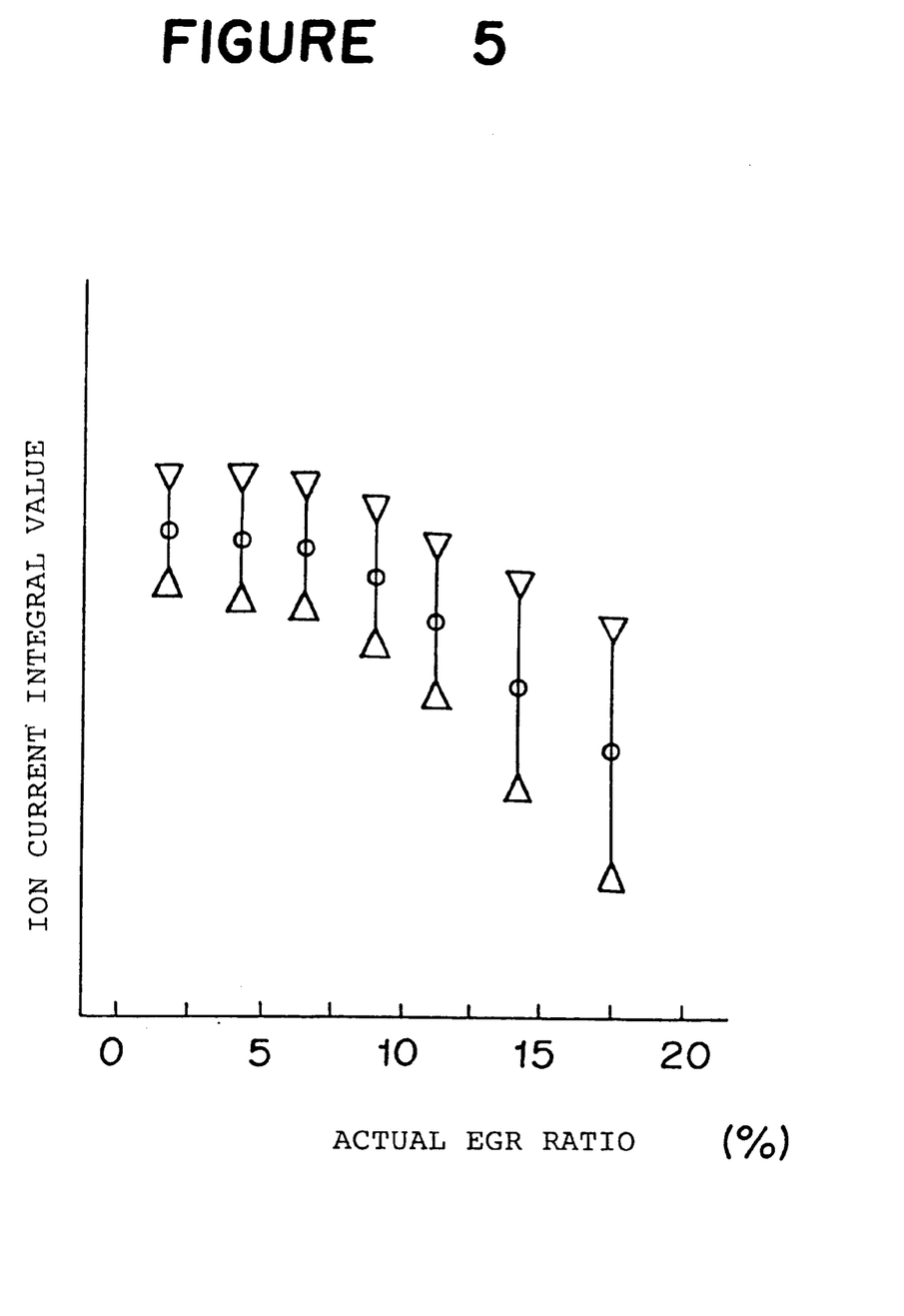
FIG. 5 is a diagram showing a relationship between the ion current integral value and the actual EGR ratio according to the third embodiment.

In FIG. 5 is shown a relationship between actual EGR ratios and the combustion state quantities (ion current integral values) obtained by the manipulations shown in this embodiment. In this Figure, the abscissa represents the actual EGR ratios, and the ordinate represents the ion current integral values. In this Figure, symbols of ○ represent an average value of the respective EGR ratios, and symbols of Δ and ∇ represents the minimum value and the maximum value of the respective EGR ratios.

The length of solid lines which extend from the respective average values in the vertical direction represents the standard deviation. In this Figure are shown the results for a first cylinder as a representative example, which were obtained by statistically manipulating the results for 20 combustion cycles. The results for other cylinders had a similar tendency.

If the EGR ratio in the same cylinder is increased, the average values of the ion current integral values indicative of the combustion state decreases depending on a change in the combustion state due to exhaust gas recirculation as shown in FIG. 5. It is also seen that the standard deviation changes depending on the EGR ratios. In other words, exhaust gas recirculation lowers the combustion amount to make combustion unstable, increasing the standard deviation.

Since the average values change depending on the state of the ignition plug of an operating range of the engine, the standard deviation or a performance function related to variation is effective as indication of variation in combustion.

In accordance with such manipulation, manipulation results which can be compared with other cycles depending on combustion amount (engine output, pressure in a cylinder) can be obtained since the ion current detected in combustion at each cylinder is integrated in a certain combustion interval.

Embodiment 4

Figure 6:
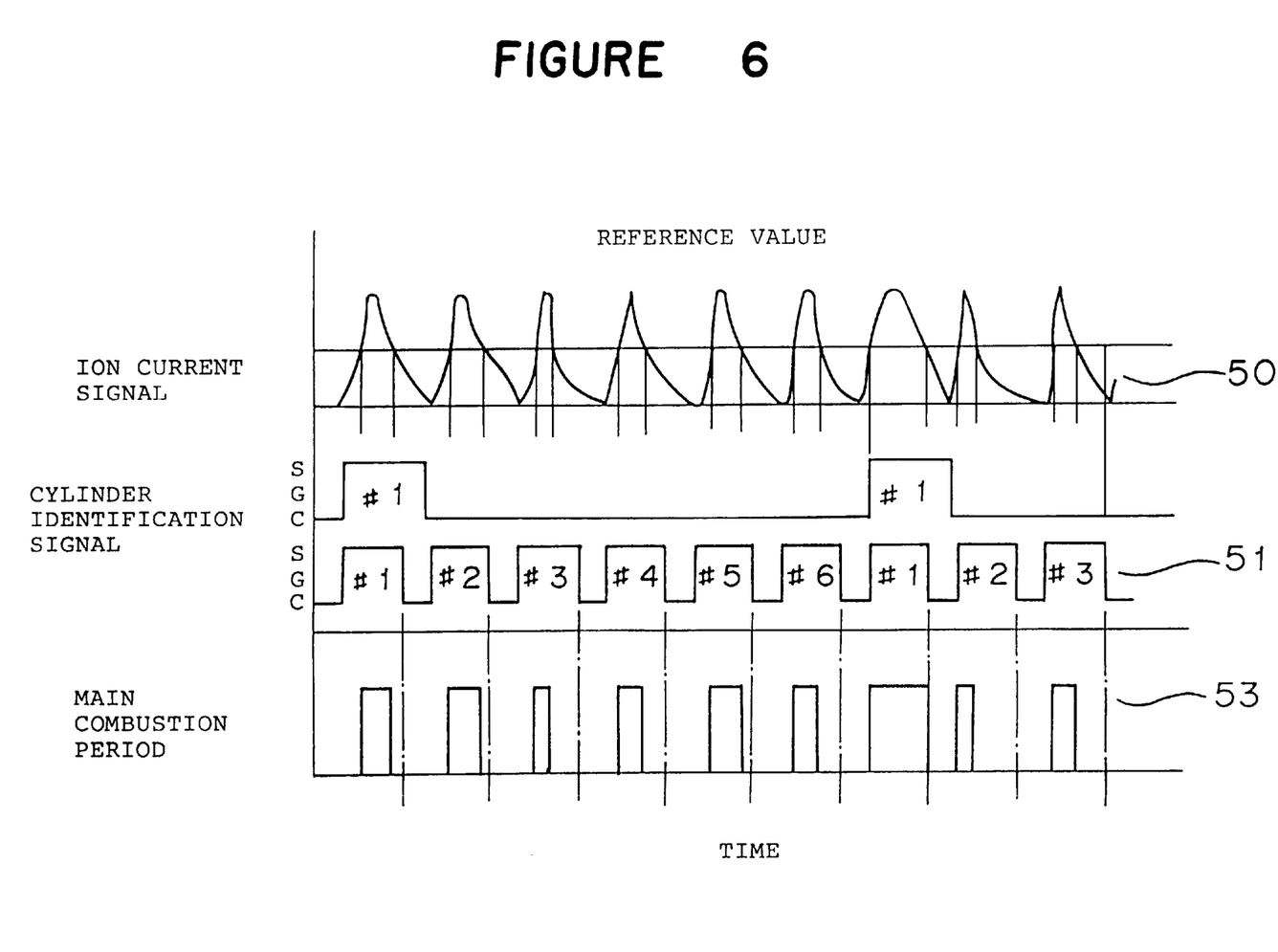
FIG. 6 is a diagram showing the ion current signal and the combustion state quantity according to a fourth embodiment of the present invention.

In this embodiment is explained another arithmetic manipulation to find the combustion state quantities, which is different from the method to find the combustion state quantities shown in the third embodiment. Like the third embodiment, the other features are the same as those of the first embodiment, and explanation of the other features will be omitted. In FIG. 6 is shown a diagram of ion current signals and combustion state quantities according to the fourth embodiment of the present invention. In this Figure, reference numeral 50 designates the waveform of each of the ion current signals, which are obtained by converting ion current outputs in the combustion cycle of each cylinder into voltages, reference numeral 51 designates cylinder identification signals which comprise an SGC signal for identifying the position of a first cylinder and an SGT signal indicative of the position of each cylinder, and reference numeral 53 designates the combustion state quantities of the respective cylinders, which were found based on the reference signals (cylinder identification signals) and a predetermined reference value.

Now, a method to find the combustion state quantities will be explained.

As explained with respect to the first embodiment using FIG. 1, an ion current signal E is converted into a digital signal through the A/D converter 28, and is outputted to the ion current processor 29.

The ion current processor 29 converts current signals into pulse-shaped waveforms based on the cylinder identification signals and the crank angle signals outputted from the crank angle sensor in the manipulation time for each cylinder as shown in FIG. 6. In the ion current processor, the period of time wherein each of the ion current signals 50 has an output voltage not less than the predetermined reference value is represented as each of the pulse-shaped waveformed indicated by the reference numeral 53. The on time of these pulses are found as a main combustion period for finding the combustion state quantities.

Figure 7:
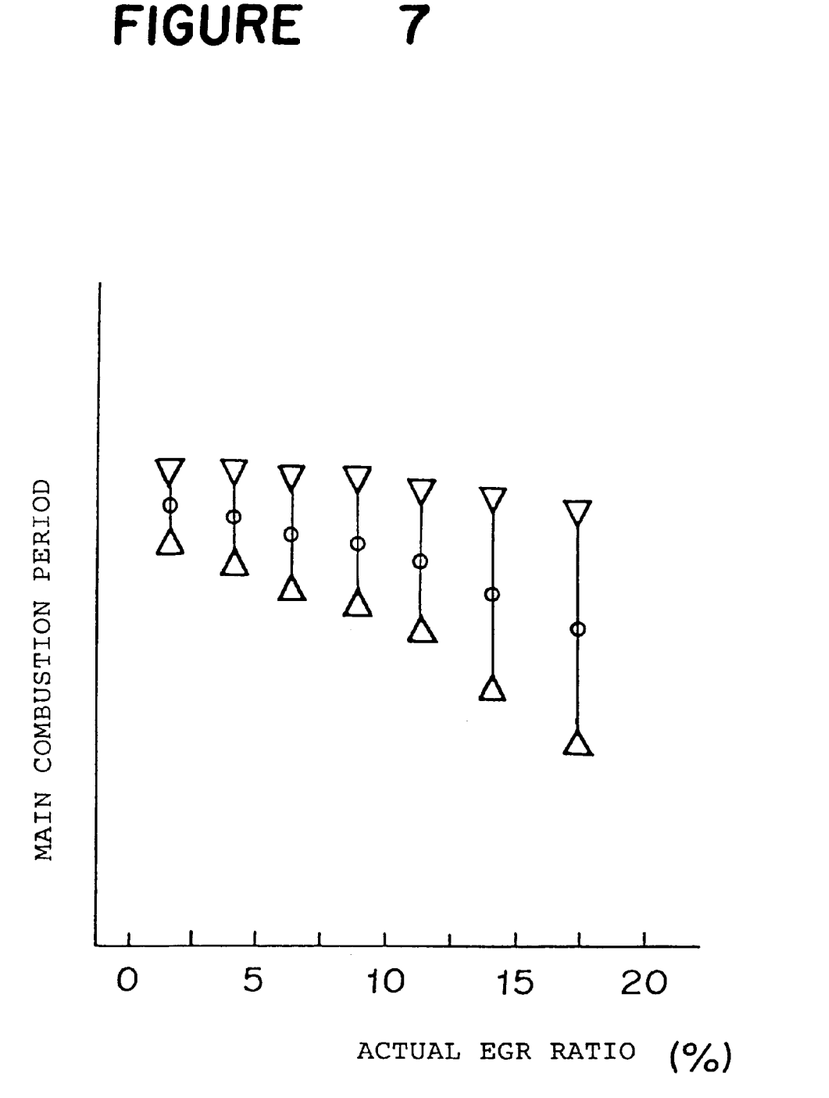
FIG. 7 is a diagram showing a relationship between the main combustion period and the actual EGR ratio according to the fourth embodiment.

In FIG. 7 is shown a diagram of the output results of the combustion state which were obtained by the manipulation according to this embodiment.

Like the integral manipulation shown in FIG. 5, standard deviations and average values change depending on actual EGR ratios even when the main combustion period are used as a parameter.

In accordance with this manipulation, it is possible to measure the main combustion periods corresponding to engine outputs by a simple method to use only a timer count for measuring the length of the pulses.

Embodiment 5

Another arithmetic manipulation method to find a combustion variable quantity, which is different from the method to find a combustion variable quantity according to the first embodiment, will be explained. The other features are the same as those of the first embodiment, and explanation of the other features will be omitted.

The combustion variable quantities in the respective cylinders can be found based on the combustion state quantities using the following formula:

$$CV_1(n) = \frac{|D(n) - D(n-1)|}{(D(n) + D(n-1))/2 \cdot \Delta_t} \quad (2)$$

In this formula, $CV_1(n)$ represents the combustion variable at an n-th combustion cycle, $D(n)$ represents the combustion state quantity at the n-th combustion cycle, and $D(n-1)$ represents the combustion state quantity at a (n-1)-th combustion cycle. $\Delta t$ represents a period of time for data sampling which corresponds to the combustion cycle.

Figure 8:
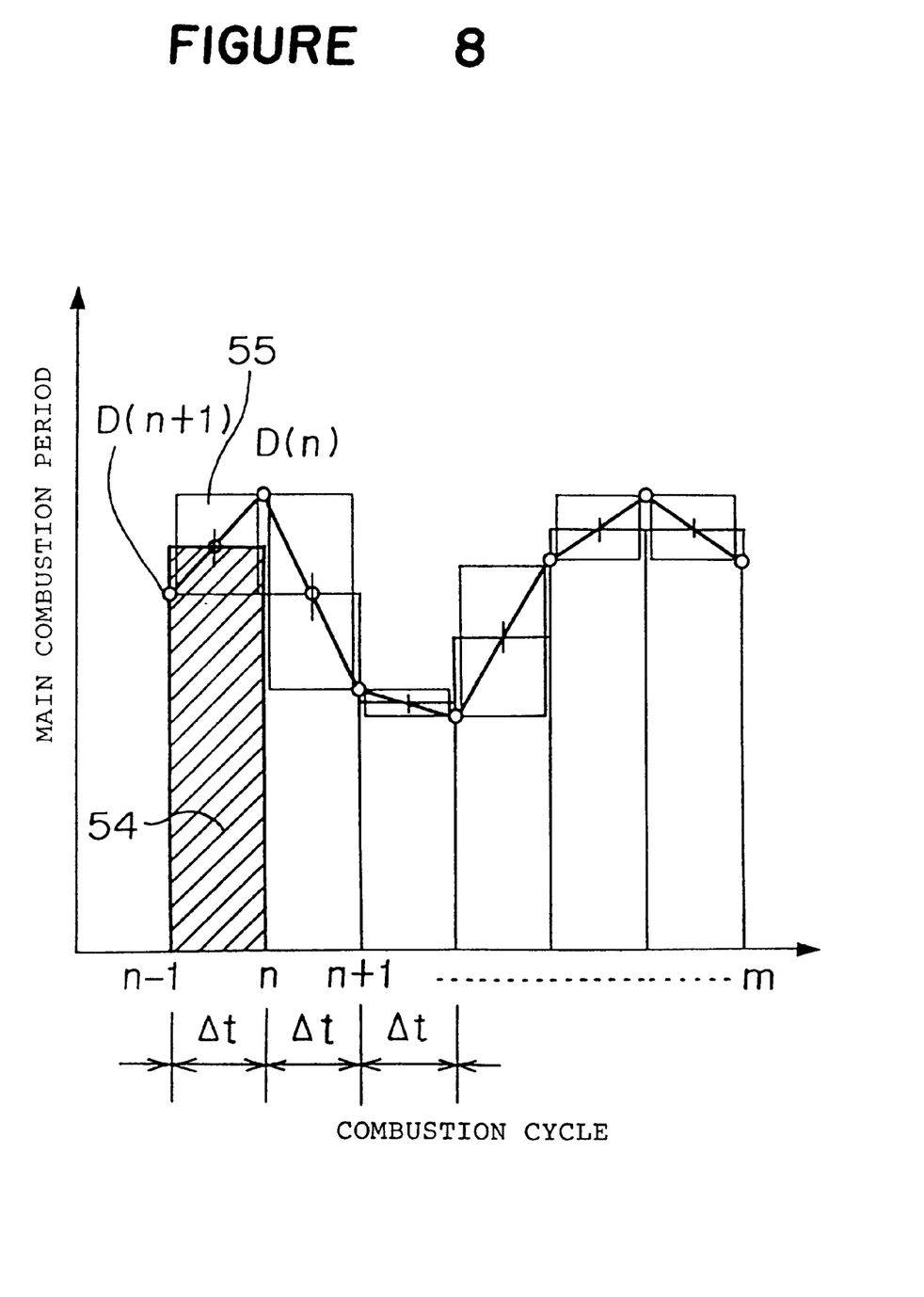
FIG. 8 is a diagram showing a relationship between the combustion cycle and the main combustion period according to a fifth embodiment of the present invention.

According to this formula, the combustion variables can be calculated in real time. As shown in FIG. 8, variable values are represented as a ratio of the absolute value of the difference between the combustion state quantity in a present combustion cycle and the combustion state quantity in the previous combustion cycle to the average value of the combustion state quantity in the present combustion cycle and that in the previous combustion cycle.

In addition, ICV(n) which is obtained by integrating the variable values by a predetermined number of times according to the following formula is used as combustion variable values:

$$ICV(n) = \sum_{n=n-m}^{n} CV_1(n) \quad (3)$$

In this formula, m represents the number of times in integration. Although m=5 is set in this embodiment, m is not limited to that number and may be altered depending on the operating conditions of the engine.

Although the value for a single cylinder is used as the value indicative of variation in combustion, the value for a representative cylinder or an average value of the values for two cylinders or more may be used.

In FIG. 8 is shown a diagram of a relationship between the combustion cycles and the combustion state quantity according to the fifth embodiment. In this Figure, the abscissa represents the combustion cycle, and the ordinary represents the combustion state quantity. A variable quantity is a value which is obtained by finding the ratio of the area 54 to the area 55 shown in FIG. 8 (the ratio of the absolute value of the difference between the combustion state quantity in the present combustion cycle and that in the previous combustion cycle to the average value of the combustion state quantity in the present combustion cycle and that in the previous combustion cycle) and integrating the ratio by m cycles. As a result, the variable values can be great to find more accurate values.

Although the main combustion period is used as the combustion state quantity in this embodiment, ion current integral values may be used.

Embodiment 6

The arithmetic manipulation method to find the combustion variable quantity according to this embodiment, which is different from the method to find the combustion variable quantity according to the first and fifth embodiments, will be explained. Like the fifth embodiment, the other features are the same those of the first embodiment, and explanation of the other features will be omitted.

The manipulation method for variation in combustion according to this embodiment is represented by the following formula:

$$CV_2(n) = \left| D(n) - \sum_{n=n-m}^{n} D(n)/m \right| \quad (4)$$

In this formula, $CV_2(n)$ represents the variation in combustion at an n-th combustion cycle, $D(n)$ represents the combustion state quantity at the n-th combustion cycle, and m represents a preset number of moving averages of data. According to this formula, the variation in combustion is represented by the absolute value of the deviation between the combustion state in a resent cycle and the moving average value for a predetermined number of times.

Although the value for a single cylinder is used as a value indicative of variation in combustion in this embodiment, the value for a representative cylinder or the average value of two cylinders or more may be used.

Figure 9:
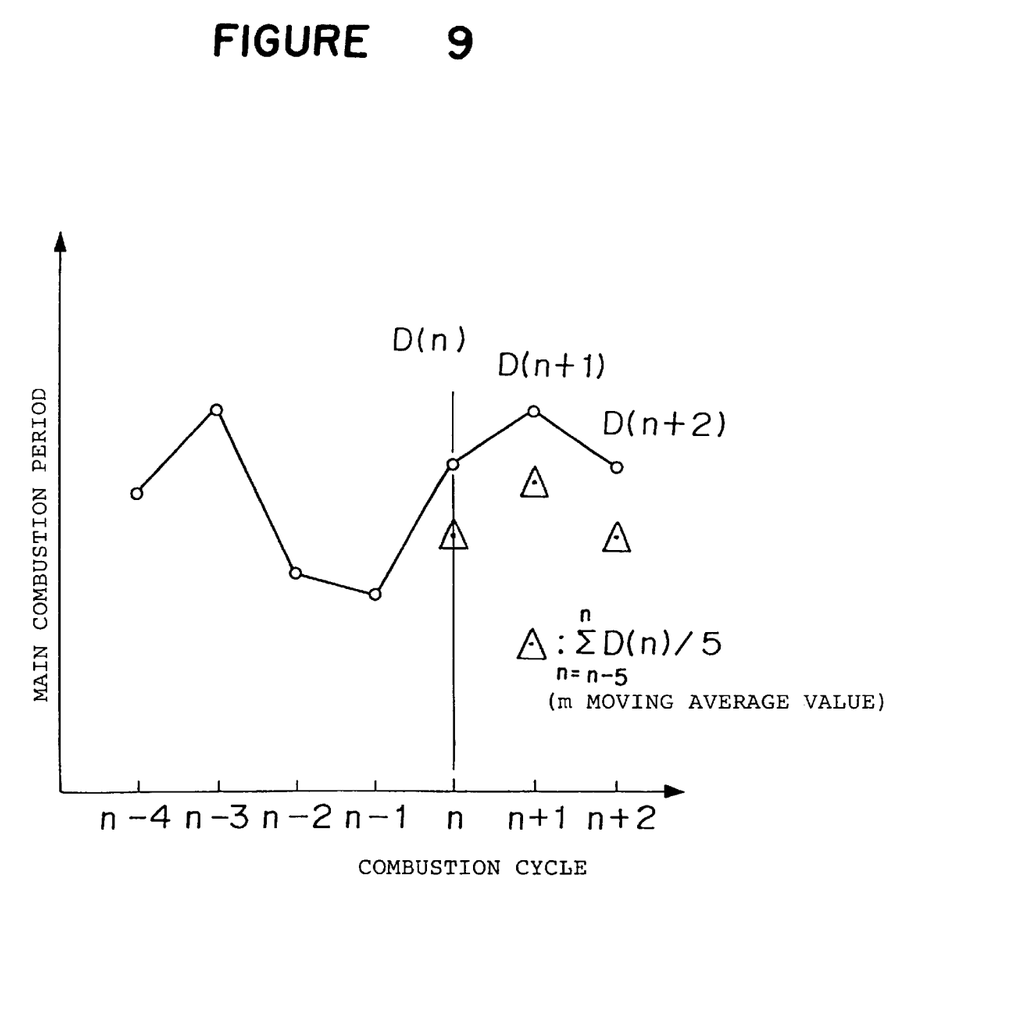
FIG. 9 is a diagram showing a relationship between the combustion cycle and the main combustion period according to a sixth embodiment of the present invention.

In FIG. 9 is shown a diagram of a relationship between the combustion cycle and the combustion state quantity according to the sixth embodiment. Although the main combustion period is used as the combustion state quantity for explanation in this embodiment, the combustion state quantity may be represented by an ion current integral value. In FIG. 9, the abscissa represents the combustion cycle, and the ordinate represents the combustion state quantity. A variable quantity is a value which is obtained by integrating the ratio of a moving average value (a value of Δ) to a combustion state quantity (a value of ○) by an m cycle. As a result, the variable value can become larger to find a more accurate value.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 9-73708 filed on Mar. 26, 1997 including specification, claims, drawings and summary are incorporated herein by reference in its entirety.

What is claimed is:

1. An exhaust gas recirculation control system for internal combustion engines, comprising:

an exhaust gas recirculation passage for recirculating a part of an exhaust gas from an internal combustion engine into the engine;

an exhaust gas recirculation control valve for controlling a flow rate of the exhaust gas flowing in the exhaust gas recirculation passage;

an opening degree controller for controlling an opening degree of the exhaust gas recirculation control valve;

an operating condition detector for detecting an operating condition of the engine;

means for setting a target exhaust gas recirculation ratio depending on the detected operating condition;

a combustion state detector for detecting a combustion state in at least one cylinder of the engine;

means for finding an actual exhaust gas recirculation ratio of the engine based on the detected combustion state; and means for controlling the opening degree controller so as to bring the actual exhaust gas recirculation ratio to the target exhaust gas recirculation ratio, wherein the combustion state detector comprises an ion current detector for flowing an ion current in at least one cylinder in the engine and detecting the ion current flowing therein, means for flowing a signal indicative of the ion current in a predetermined period of time to carry out generation and detection of a current component corresponding to a combustion level in the cylinder, combustion state quantity finding means for finding a combustion state quantity in the cylinder based on the detected current component, and combustion variable quantity finding means for finding a variable quantity in the cylinder based on the combustion state in a present cycle and the combustion state in a cycle prior to the present cycle found by the combustion state quantity finding means.

2. The control system according to claim 1, further comprising failure detecting means for determining that when a deviation between the target exhaust gas recirculation ratio and the actual exhaust gas recirculation ratio is not less than a predetermined value for a predetermined period of time, a failure occurs.

3. The control system according to claim 1, wherein the combustion variable quantity finding means finds the variable quantity by finding a standard deviation of combustion state quantities in a predetermined period of cycles obtained by the combustion state quantity finding means.

4. The control system according to claim 1, wherein the combustion variable quantity finding means finds a variable state based on a ratio of an absolute value of a difference between a first combustion state quantity in a present cycle obtained by the combustion state quantity finding means and a second combustion state quantity in a cycle prior to the present cycle obtained by the combustion state quantity finding means to an average value of the first combustion state quantity and the second combustion state quantity, and finds the variable quantity by integrating the variable state by a predetermined cycle number.

5. The control system according to claim 1, wherein the combustion variable quantity finding means finds the variable quantity by finding a deviation of the combustion state quantity in a present cycle obtained by the combustion state quantity finding means and a moving average value in a predetermined period of cycles prior to the present cycle obtained by the combustion state quantity finding means.

6. The control system according to claim 1, wherein the combustion state quantity is represented by an ion current integral value or a main combustion period.

7. The control system according to claim 6, wherein the main combustion period is a period wherein the ion current detected by the ion current detector is not less than a predetermined value.

8. An exhaust gas recirculation control system for internal combustion engines, comprising:

an exhaust gas recirculation passage for recirculating a part of an exhaust gas from an internal combustion engine into the engine;

an exhaust gas recirculation control valve for controlling a flow rate of the exhaust gas flowing in the exhaust gas recirculation passage;

an opening degree controller for controlling an opening degree of the exhaust gas recirculation control valve;

a combustion state detector for detecting a combustion state in at least one cylinder of the engine; and failure detecting means which compares the combustion state detected by opening and closing the exhaust gas recirculation control valve, and determines that when a result obtained by the comparison is outside a predetermined range, a failure occurs, wherein the combustion state detector comprises an ion current detector for flowing an ion current in at least one cylinder in the engine and detecting the ion current flowing therein, means for flowing a signal indicative of the ion current in a predetermined period of time and carrying out generation and detection of a current component corresponding to a combustion level in the cylinder based on a signal indicative of the detected ion current, combustion state quantity finding means for finding a combustion state quantity in the cylinder based on the detected current component, and combustion variable quantity finding means for finding a variable quantity in the cylinder based on the combustion state in a present cycle and the combustion state in a cycle prior to the present cycle found by the combustion state quantity finding means.

9. The control system according to claim 8, wherein the combustion variable quantity finding means finds the variable quantity by finding a standard deviation of combustion state quantities in a predetermined period of cycles obtained by the combustion state quantity finding means.

10. The control system according to claim 8, wherein the combustion variable quantity finding means finds a variable state based on a ratio of an absolute value of a difference between a first combustion state quantity in a present cycle obtained by the combustion state quantity finding means and a second combustion state quantity in a cycle prior to the present cycle obtained by the combustion state quantity finding means to an average value of the first combustion state quantity and the second combustion state quantity, and finds the variable quantity by integrating the variable state by a predetermined cycle number.

11. The control system according to claim 8, wherein the combustion variable quantity finding means finds the variable quantity by finding a deviation of the combustion state quantity in a present cycle obtained by the combustion state quantity finding means and a moving average value in a predetermined period of cycles prior to the present cycle obtained by the combustion state quantity finding means.

12. The control system according to claim 8, wherein the combustion state quantity is represented by an ion current integral value or a main combustion period.

13. The control system according to claim 12, wherein the main combustion period is a period wherein the ion current detected by the ion current detector is not less than a predetermined value.

* * * * *